Nov. 13, 1934.  D. MacNICOLL  1,980,591
SAFETY VALVE INSTALLATION FOR STEAM GENERATORS
Filed Dec. 14, 1932  3 Sheets-Sheet 2

Inventor
Donald MacNicoll
By Pennie Davis Marvin + Edmonds
Attorneys

Nov. 13, 1934.  D. MacNICOLL  1,980,591
SAFETY VALVE INSTALLATION FOR STEAM GENERATORS
Filed Dec. 14, 1932  3 Sheets-Sheet 3
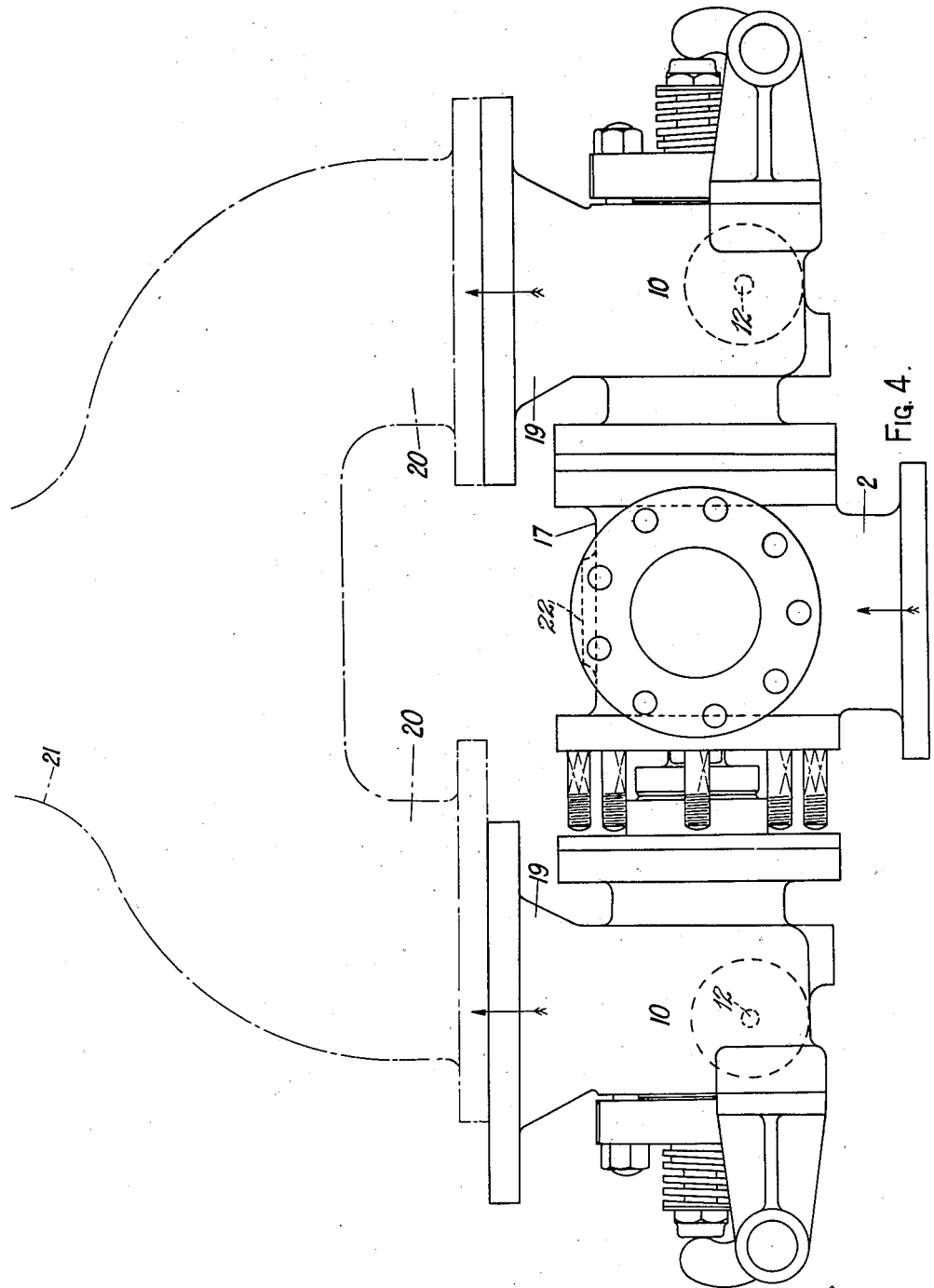

Patented Nov. 13, 1934

1,980,591

UNITED STATES PATENT OFFICE 1,980,591

SAFETY VALVE INSTALLATION FOR STEAM GENERATORS

Donald MacNicoll, Cardonald, near Glasgow, Scotland

Application December 14, 1932, Serial No. 647,116

1 Claim. (Cl. 137—53)

This invention relates to safety valve installations for steam generators.

The invention has for an object to provide an improved and rugged installation including a pair of independently operable piston-actuated safety valves having a common inlet and controlled by auxiliary valves with which are associated a sentinel valve and an audible alarm device, the several components of the installation being arranged in a compact manner and being adapted to facilitate assembly and dismantling.

A particular object of the invention is to provide an improved safety-valve arrangement and construction in which, when the generator pressure exceeds a predetermined amount, the sentinel valve will be opened and admit steam to the audible signalling device, and in which, at the same time, one of the auxiliary valves will also be opened and admit steam to its associated main safety valve, and in which combination, upon still further increase in steam pressure, the other auxiliary valve will open and admit the excess steam to the remaining safety valve, whereby failure to notice the opening of the first valve will be taken care of.

Figure 1:
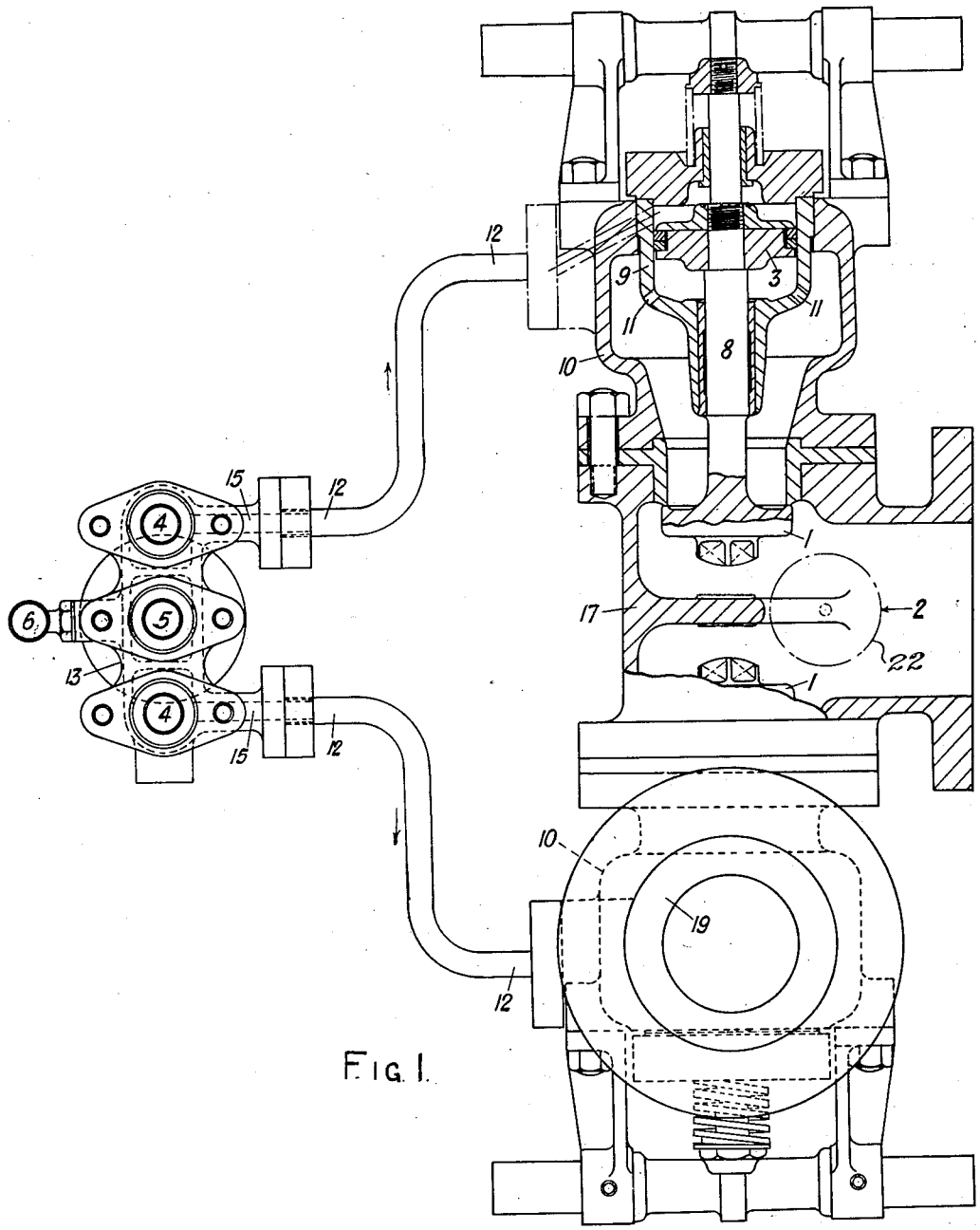
Figure 3:
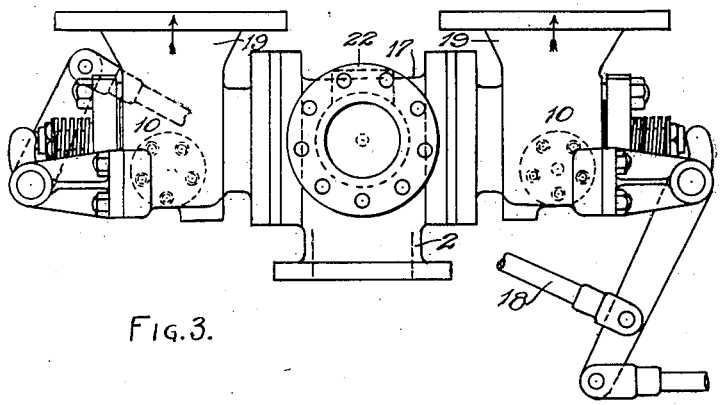
Figure 2:
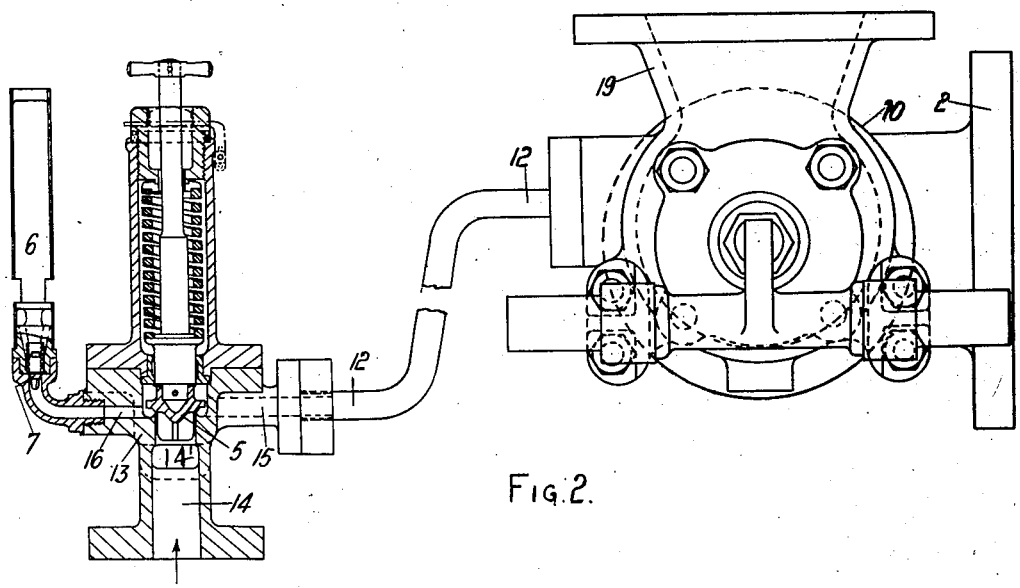

A safety valve installation constructed in accordance with the invention is illustrated in the accompanying drawings in which Fig. 1 is a part plan part horizontal section, Fig. 2 a part side elevation part vertical section, Fig. 3 an elevation at right angles to Fig. 2, and Fig. 4 an elevation similar to Fig. 3 but illustrative of a constructional feature not apparent from Fig. 3.

Referring to the drawings, the installation shown comprises a pair of independently operable safety valves 1 having a common inlet 2 and normally maintained seated under load due to inlet pressure. Each valve 1 is connected to a piston 3 adapted to be displaced in the direction to impart opening movement to the associated valve 1 by steam admitted to one side of the piston 3 under the control of a spring-loaded auxiliary valve 4 located remote from the safety valves 1. 5 denotes a spring-loaded sentinel valve in parallel with the auxiliary valves 4 and in series with an audible alarm device 6 which is supplied with steam when the sentinel valve 5 opens under a predetermined steam pressure.

The audible alarm device 6 shown is in the form of a whistle incorporating a spring-loaded inlet valve 7.

The pistons 3 are secured on the safety valve spindles 8 and operate in chambers 9 located within the safety valve chests 10. The faces of the pistons 3 adjacent to the valves 1 are open to the outlets from the valves 1 by way of apertures 11 in the chambers 9. The faces of the pistons 3 remote from the valves 1 are adapted to be exposed to pressure steam under the control of the auxiliary valves 4, such steam passing by way of pipes 12 from the auxiliary valves 4 to the outer faces of the pistons 3. The circle at 10, in Figs. 3 and 4, is the outer periphery of a flange union for the pipe 12.

The auxiliary valves 4 and the sentinel valve 5 are housed within a common valve chest 13 having an inlet branch 14 adapted to be connected to a steam generator and having outlet branches 15 from the valves 4 connected to the pipes 12. 16 denotes the outlet passage from the sentinel valve 5, connected to the whistle 6. The inlet branch 14 opens into a chamber 14' disposed below, and common to the auxiliary and sentinel valves 4, 5.

The safety valve chests 10 are bolted to a common branch piece 17 presenting the inlet 2 which latter is adapted to be connected to the steam generator.

As shown in Fig. 3 the operating levers of both safety valves are interconnected by a link 18 for operation together.

The safety valve chests 10 are formed with upwardly directed waste steam branches 19 to which are connected twin branches 20 of a common uprising waste steam pipe 21.

As shown in Fig. 4, one safety valve unit may be detached from the branch piece 17 and from the relative waste pipe branch 20 for inspection or repair while the waste steam pipe 21 is wholly supported by the other safety valve unit.

As shown in Figs. 1 and 2, the common inlet 2 is horizontally disposed, while in Figs. 3 and 4 said inlet is vertically disposed, it being understood that the inlet may be arranged in any convenient position to suit the generator mounting arrangement.

The auxiliary valves 4 are substantially similar to the sentinel valve 5 shown in detail in vertical section in Fig. 2.

A boss 22 is provided on the branch piece 17 for a pressure gauge or other auxiliary connection.

In operation, when the generator steam pressure exceeds a predetermined amount, the sentinel valve 5 opens and admits steam to the whistle 6 so that audible warning is given. One of the auxiliary valves 4 also opens and admits steam to the piston chamber 9 of the associated safety valve, whereby said safety valve is opened to relieve the generator steam pressure. With further increase of generator steam pressure, the other auxiliary valve also opens and admits steam to the piston chamber of the other safety valve, whereby said other safety valve also opens to prevent dangerous increase of generator steam pressure.

I claim:—

A safety valve installation comprising a pair of independently operable safety valves having a common inlet and normally held seated under load due to inlet pressure, an actuating piston connected to each of said valves, each piston being adapted to be displaced in the direction to impart opening movement to the connected valve by pressure fluid admitted to one side of said piston, unequally spring-loaded auxiliary valves remote from said safety valves and each controlling the passage of pressure fluid to one of said pistons, a spring-loaded sentinel valve in parallel with said auxiliary valves, and set to open at the same pressure as the more lightly loaded auxiliary valve, an audible alarm device in series with said sentinel valve, and a connection controlled by said sentinel valve for admitting fluid pressure to said alarm device.

DONALD MacNICOLL.